United States Patent
Suzuki

(10) Patent No.: US 6,529,188 B1
(45) Date of Patent: Mar. 4, 2003

(54) TOUCH PANEL AND SCREEN INPUT TYPE LIQUID CRYSTAL DISPLAY DEVICE

(75) Inventor: Shigeki Suzuki, Funabashi (JP)

(73) Assignees: Hitachi, Ltd., Tokyo (JP); Hitachi Chiba Electronics, LTD, Chiba-ken (JP)

( * ) Notice: Subject to any disclaimer, the term of this patent is extended or adjusted under 35 U.S.C. 154(b) by 170 days.

(21) Appl. No.: 09/782,028

(22) Filed: Feb. 14, 2001

(30) Foreign Application Priority Data

Mar. 6, 2000 (JP) .......................................... 2000-061110

(51) Int. Cl.$^7$ ................................................. G09G 5/00
(52) U.S. Cl. ........................ 345/173; 345/179; 345/104; 345/182
(58) Field of Search ................................. 345/104, 173, 345/179, 182; 349/12; 178/18.01, 18.03, 18.05, 18.07, 19.01–19.05

(56) References Cited

U.S. PATENT DOCUMENTS 5,907,375 A  *  5/1999  Nishikawa et al. ........... 349/12
6,456,279 B1  *  9/2002  Kubo et al. ................... 345/173

FOREIGN PATENT DOCUMENTS

JP          6-195176          7/1994

* cited by examiner

*Primary Examiner*—Steven Saras
*Assistant Examiner*—Fritz Alphonse

(57) ABSTRACT

The present invention is provided for preventing the occurrence of cracks on an upper resistance film 11 derived from the repeated push inputting manipulation so as to eliminate the erroneous operation of coordinates detection. To achieve such an object, an upper substrate 4A having the upper resistance film 11 formed on an inner surface of a soft film member and a lower substrate 4B having a lower resistance film 12 formed on an inner surface of a hard plate are laminated with each other while inserting dot spacers 90 in a gap defined between opposing surfaces of the respective resistance films 11, 12, an input inoperable region NR where the upper substrate 4A is bent toward the lower substrate 4B is provided to a periphery of an input region AR by the push inputting manipulation, and a stress attenuating member 100A which gradually decreases a height thereof from the seal region SL side to the input region AR side is provided to the input inoperative region NR.

8 Claims, 11 Drawing Sheets

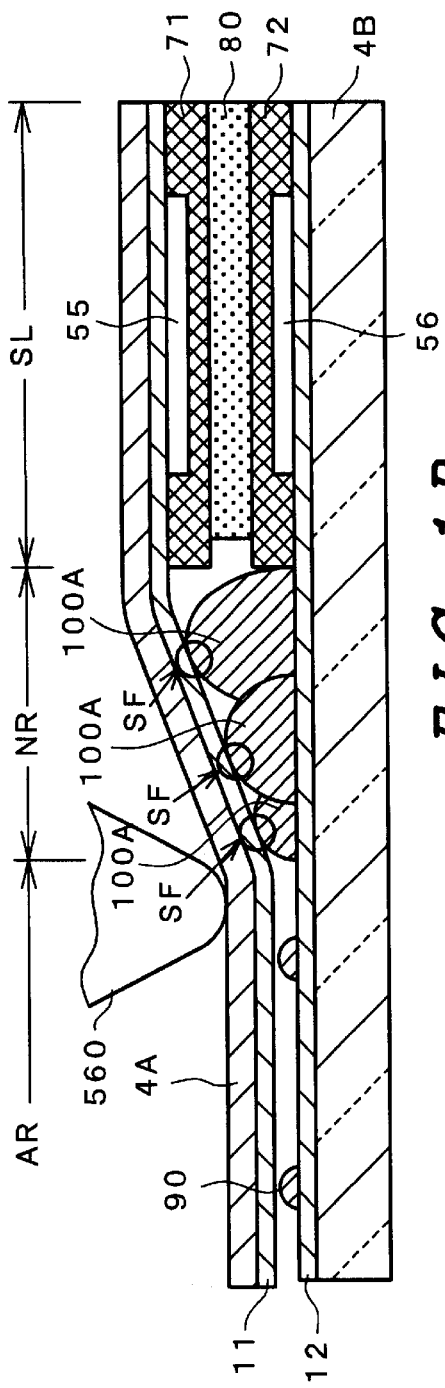
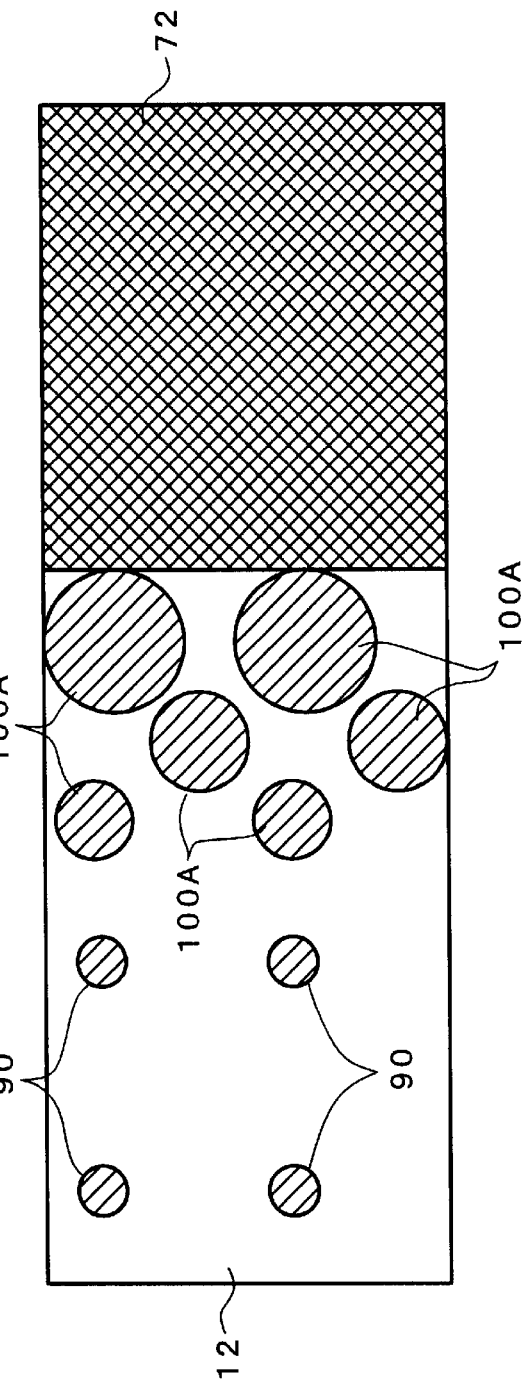
FIG. 1A
FIG. 1B

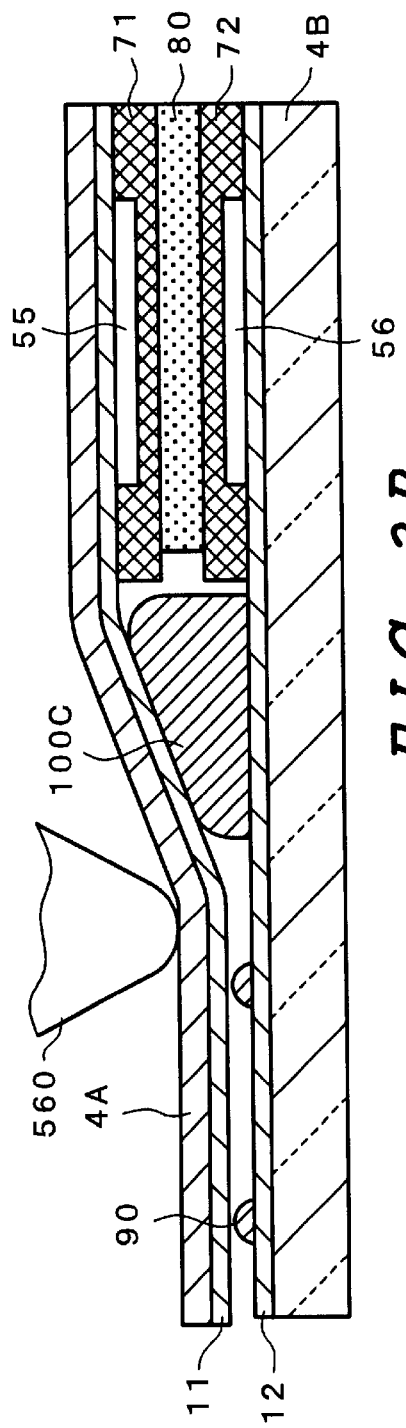
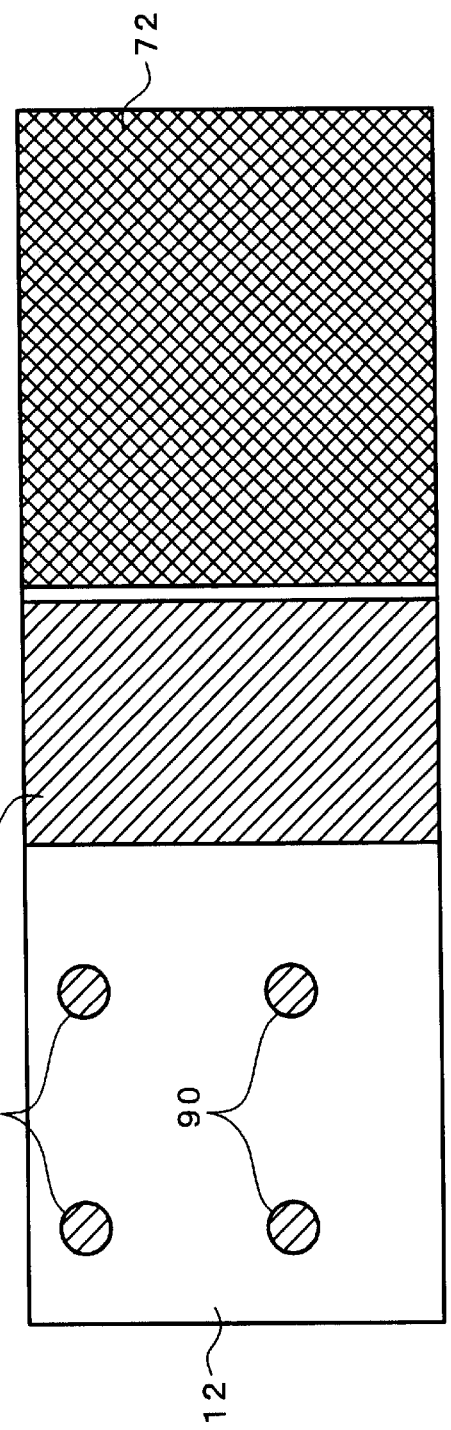

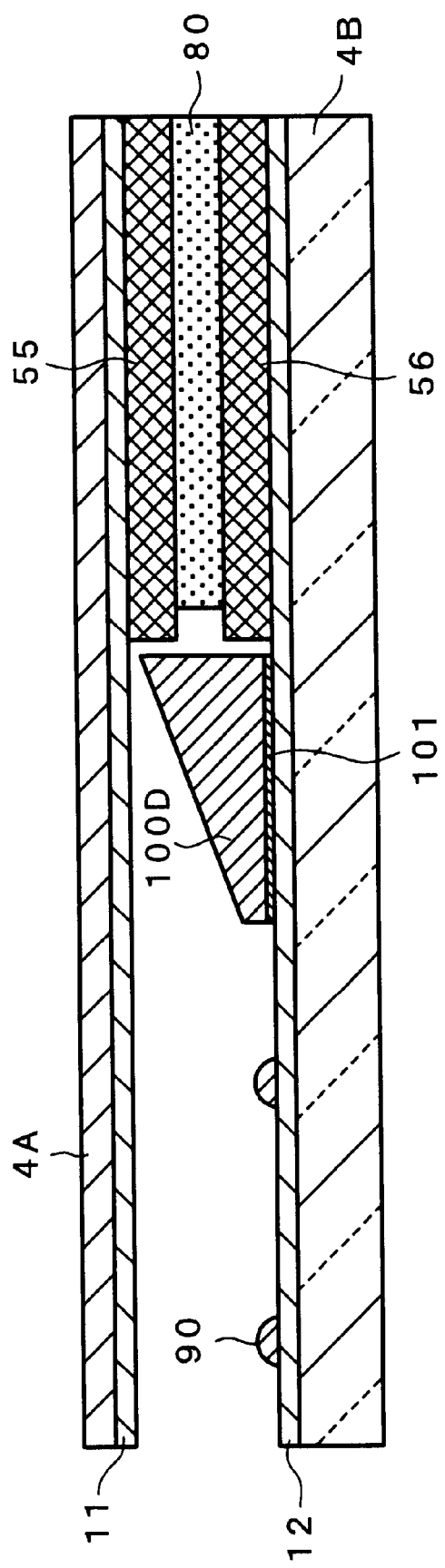

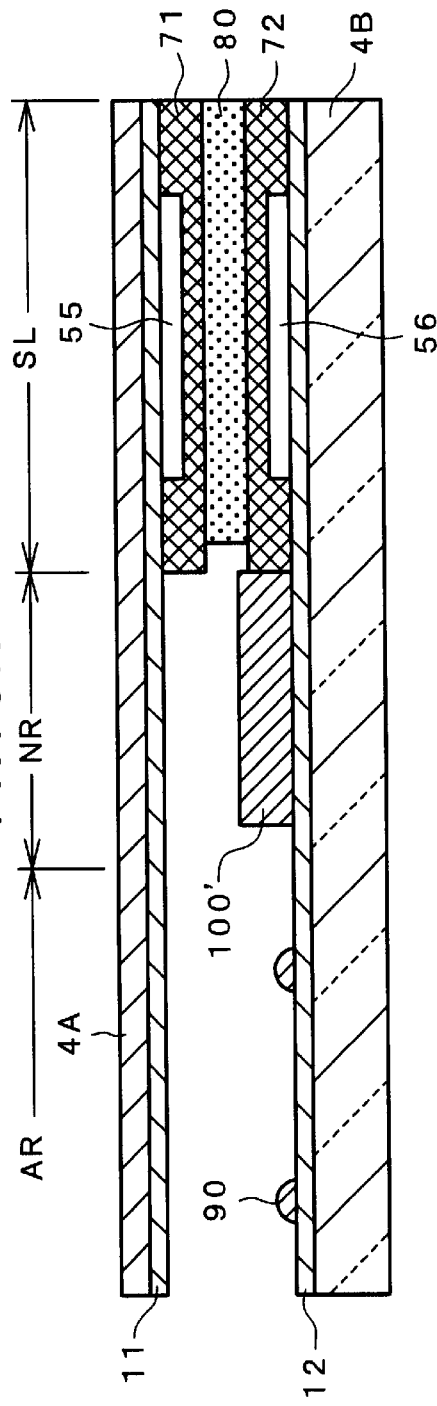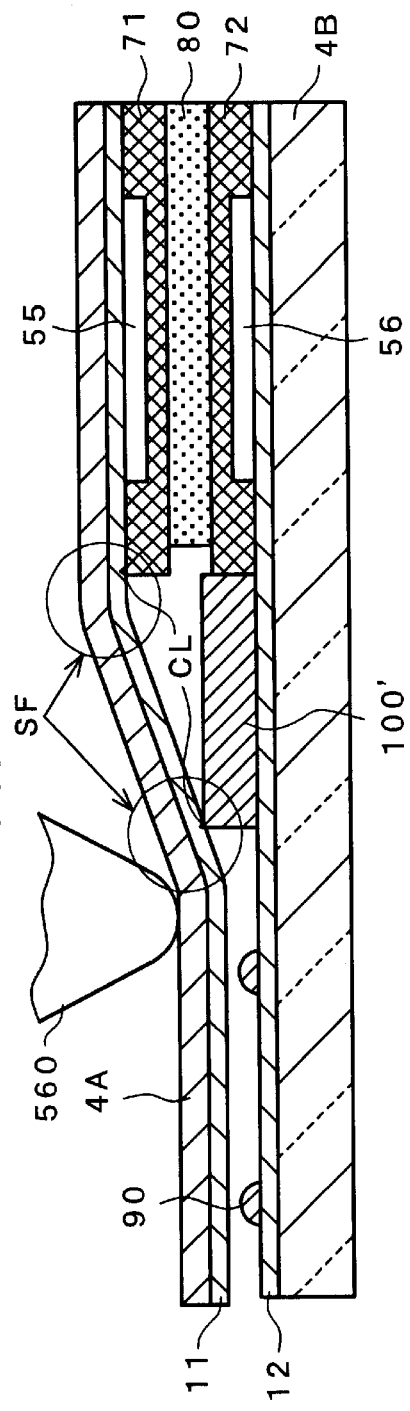

TOUCH PANEL AND SCREEN INPUT TYPE LIQUID CRYSTAL DISPLAY DEVICE

BACKGROUND OF THE INVENTION (1) Field of the Invention

The present invention relates to a touch panel which detects input coordinates in response to the change of resistance due to a push inputting manipulation and a screen input type liquid crystal display device constituted by laminating this touch panel thereto.

(2) Description of the Related Art

In a liquid crystal display device which is used as display means of a personal computer or a monitor of other device, an illumination light is irradiated to images formed on a liquid crystal panel and transmitting light or reflected light are irradiated to a display surface side so as to visualize the images.

In general, this type of liquid crystal display device uses a liquid crystal panel which inserts a liquid crystal layer into a gap defined between a pair of substrates having pixel selecting electrodes and the like at the time of laminating these substrates and forms images by changing the orientation state of liquid crystal molecules of selected pixel portions. Since the formed images per se are not in the visible state, light is given from outside and is irradiated to the liquid crystal panel and the transmitting light or the reflected light is observed.

Recently, information terminals which use this type of liquid crystal display device as display means have been widely used, wherein the information terminal is provided with a touch panel which is laminated to a screen of the liquid crystal display device (a display surface side of the liquid crystal panel which constitutes the liquid crystal display device) and inputs various information by a push manipulation through the screen.

Various types of touch panels exist in view of their operation principles and the most popular type is a type which detects input coordinates in response to a resistance change quantity, that is, a so-called analogue resistance film type.

The touch panel of this analogue resistance film type has one substrate which is disposed at an information input side constituted by a soft film such as a transparent plastic sheet and other substrate constituted by a transparent hard substrate preferably made of glass. The touch panel is further provided with resistance films on respective opposing surfaces of these two transparent substrates. In operation, a two-dimensional coordinates value is detected in response to resistance values between the resistance films of respective substrates which are brought into contact with each other by a push inputting manipulation applied from one substrate side and output terminals.

FIG. 13 is a schematic cross-sectional view which explains a schematic constitutional example of a screen input type liquid crystal display device which constitutes a liquid crystal display device provided with a touch panel. This screen input type liquid crystal display device is constituted by laminating a touch panel 4 to a liquid crystal panel 1. Although a light guide plate 2 which constitutes an auxiliary light source device 3 is inserted between the liquid crystal display device 1 and the touch panel 4, a screen input type liquid crystal display device which installs the auxiliary light source device 3 at the rear side of the liquid crystal display panel or a screen input type liquid crystal display device which has no auxiliary light source device 3 have been commercially available. In the drawing, numeral 3A indicates a lamp which constitutes the auxiliary light source device 3 and numeral 3B indicates a lamp reflection sheet which also constitutes the auxiliary light source device 3.

FIG. 14A and FIG. 14B are schematic cross-sectional views for explaining the constitution of an essential part of the touch panel and the state at the time of push inputting manipulation in FIG. 13. In the drawing, numeral 4A indicates an upper substrate made of a transparent film sheet and numeral 4B indicates a lower substrate made of a glass plate. On inner surfaces of these two substrates 4A and 4B, an upper resistance film 11 and a lower resistance film 12 are respectively formed by coating. Further, to an input region of the lower resistance film 12 formed on the lower substrate 4B, dot spacers 90 which prevent the upper and lower resistance films 11, 12 from coming into contact with each other in the non-inputting manipulation state are provided. These dot spacers 90 are formed by a printing by way of a mask having given apertures or a photolithography technique using photosensitive resin or other techniques.

The resistance films 11, 12 are respectively electrically connected with upper and lower wiring 55, 56 formed by printing on a seal region SL disposed at an outermost periphery of the touch panel. These upper wiring 55 and the lower wiring 56 are connected with a coordinates recognition circuit provided outside through lead wires not shown in the drawing.

The upper wiring 55 and the lower wiring 56 are respectively coated with protective films (insulation films) 71, 72 and these protective films 71, 72 are connected with each other by means of a sealing agent (adhesive agent or adhesive sheet) 80.

In the inside of the seal region SL, an input region AR is positioned by way of an inoperable region NR. The inoperable region NR is a portion which becomes insensitive at the time of push inputting manipulation. As shown in FIG. 14B, this inoperable region NR corresponds to an input invalid space which is generated when the upper substrate 4A is deflected toward the lower substrate 4B due to the pushing of a pen 560 which constitutes inputting means.

In general, to prevent the information inputting error at the time of push inputting manipulation with the pen 560, an inoperable region forming member 100' is disposed in this inoperable region NR. That is, the inoperable region forming member 100' is provided such that a tip of the pen surely enters the input region AR in the state shown in FIG. 14B.

SUMMARY OF THE INVENTION

However, with respect to the conventional touch panel having such a constitution, since a gap defined between the upper substrate 4A and the lower substrate 4B is large and the inoperable region forming member 100' disposed in the inoperable region has a rectangular cross section, the upper substrate 4A is largely bent and deflected toward the lower substrate 4B due to the repeated push inputting manipulation of the pen 560. Accordingly, when the upper substrate 4A is deflected, a bending stress is concentrated on edge portions SF of the upper protective film 71 of the upper substrate 4A and the inoperable region forming member 100'.

As a result of repeated concentration of the bending stress, cracks CL occur on the upper resistance film 11 at the stress concentrated portions SF and hence, there have been problems such that it gives rise to an erroneous operation in coordinates detection or the upper substrate 4A per se suffers from damages thus giving rise to the failure in final products.

It is a first object of the present invention to provide a touch panel which can overcome the problems of the above-mentioned prior art and can prevent the upper resistance film 11 from the occurrence of cracks CL even when the push inputting manipulation is repeatedly performed and can obviate the erroneous operation in the coordinates detection, and to provide a screen input type liquid crystal display device having a high reliability which adopts such a touch panel.

To achieve the above-mentioned object, the touch panel of the present invention comprises:

an upper substrate having an upper resistance film formed on an inner surface of a soft film member, a lower substrate having a lower resistance film formed on an inner surface of a hard plate, a seal region for laminating the upper substrate and the lower substrate, dot spacers disposed in a gap defined between opposing surfaces of the upper and lower resistance films, an input region capable of obtaining a detection output which sets a contact position of the upper resistance film and the lower resistance film as a two-dimensional coordinates value when a push inputting manipulation is performed to push the upper substrate to the lower substrate side, and an input inoperable region where the upper substrate is bent toward the lower substrate side due to the push inputting manipulation in a periphery of the input region and in the inside of the seal region, wherein the touch panel further includes a stress attenuating member which gradually decreases a height thereof from the seal region side to the input region side in the input inoperable region.

Due to such a constitution, while having the function of the inoperable region forming member of the prior art which has been explained in view of FIG. 14A and FIG. 14B, the stress attenuating member also has a following function. That is, the inoperable forming member comes into contact with a plurality of points in the state that the upper substrate is deflected by the push inputting manipulation with a pen tip so that the bending stress of the upper substrate (also simply called "stress" hereinafter) can be dispersed to several portions thus attenuating the stress concentration. Accordingly, the occurrence of cracks onto the upper resistance film formed on the upper substrate or damages on the upper substrate per se which is derived from the repeated push inputting manipulation can be obviated.

Typical constitutions provided to the above-mentioned touch panel are as follows. That is, 1) The upper resistance film and the lower resistance film are both constituted by a planar or flattened resistance film (uniform film).

2) Either one or both of the upper resistance film and the lower resistance film are made of a large number of comb-shaped resist films having one ends thereof formed into a common connection portion. When both resistance films have the comb-shaped resistance films, they are arranged in an intersecting manner from each other.

3) The stress attenuating member is formed of a material equal to a material of the dot spacers which are provided for forming a gap between opposing surfaces of the upper and lower substrates to prevent the constant contact of the resistance films formed on the upper and lower substrates.

4) The stress attenuating member is constituted by a set made of a plurality of independent members whose heights are decreased from an outer peripheral side of the touch panel, that is, the seal region side to the input region side. These independent members may have any one of a conical cross section, a cylindrical cross section, an elliptic-conical cross section or a polygonal cross section including a triangular cross section. These independent members may have their cross-sectional area decreased corresponding to the decrease of their heights.

5) The stress attenuating member is constituted by a plurality of continuous wall members whose heights are decreased from the seal region side to the input region side of the touch panel and these wall members are arranged concentrically about the center of the input region. These continuous wall members are formed in a bank shape which surrounds the input region and may have any one of a conical cross section, a cylindrical cross section, an elliptic-conical cross section or a polygonal cross section including a triangular cross section. These continuous wall members may have their cross-sectional area decreased corresponding to the decrease of their height.

6) The stress attenuating member is formed on the lower substrate side. Although a similar effect can be obtained by forming the stress attenuating member on the upper substrate side, by simultaneously forming the stress attenuating member at the time of forming the dot spacers or the protective film (insulation film) on the lower substrate, it is unnecessary to increase the fabrication steps.

7) To the upper substrate or the lower substrate, a lower resistance film connection portion or an upper resistance film connection portion which is electrically connected with the common connection portion of the lower substrate or the upper substrate is provided.

8) The upper resistance film and the lower resistance film are formed into a shape made of a large number of thin comb-like resistance films which are provided with a common connection portion at one ends thereof. Due to such shape made of thin comb-like resistance film, the resistance control of respective resistance films can be facilitated.

9) The upper resistance film member is formed into a shape made of a large number of thin comb-like resistance films which are provided with a common connection portion at one ends thereof and the lower resistance film is formed into a uniform resistance film. Due to such shape made of thin comb-like resistance film, the resistance control of upper resistance film can be facilitated.

A screen input type liquid crystal display device adopting the above-mentioned touch panel comprises:

a liquid crystal panel sandwiching a liquid crystal layer between a pair of substrates, and the touch panel laminated to a screen of the above-mentioned liquid crystal panel, wherein the touch panel comprises:

an upper substrate having an upper resistance film formed on an inner surface of a soft film member, a lower substrate having a lower resistance film formed on an inner surface of a hard plate, a seal region for laminating the upper substrate and the lower substrate, dot spacers disposed in a gap defined between opposing surfaces of the upper and lower resistance films, an input region capable of obtaining a detection output which sets a contact position of the upper resistance film and the lower resistance film as a two-dimensional coordinates value when a push inputting manipulation is performed to push the upper substrate to the lower substrate, and an input inoperable region where the upper substrate is bent toward the lower substrate side due to the push inputting manipulation in a periphery of the input region and in the inside of the seal region, and the touch panel further including a stress attenuating member which gradually decreases a height thereof from the seal region side to the input region side in the input inoperable region.

Due to such a constitution, while ensuring the function of the inoperable region forming member of the prior art, the stress attenuating member provided to the touch panel also has a function of dispersing the bending stress of the upper substrate which is generated in the state that the upper substrate is deflected due to the push inputting manipulation with a pen tip thus attenuating the concentration of the bending stress. Accordingly, the occurrence of cracks onto the upper resistance film formed on the upper substrate or the damages on the upper substrate per se can be obviated so that the erroneous operation of the coordinates inputted to the screen can be prevented thus providing a screen input type liquid crystal display device having a high reliability.

Typical constitutions provided to the touch panel which constitutes the above-mentioned screen input type liquid crystal display device are as follows. That is, 1) The upper resistance film and the lower resistance film are both constituted by a planar or flattened resistance film (uniform film).

2) Either one or both of the upper resistance film and the lower resistance film are made of a large number of comb-shaped thin resist films having one ends thereof formed into a common connection portion. The upper resistance film and the lower resistance film have their comb-shaped thin resistance films to intersect with each other.

3) The stress attenuating member is made of a material which is equal to a material of the dot spacers for defining the gap between the upper and lower substrates or a protective film (insulation film) for coating a wiring.

4) The stress attenuating member is constituted by a set made of a plurality of independent members whose heights are decreased from the seal region side to the input region side.

5) The stress attenuating member is constituted by a plurality of parallel continuous wall members whose heights are decreased from the seal region side to the input region side of the touch panel and these wall members are arranged concentrically about the center of the input region.

6) The stress attenuating member is formed on the lower substrate side.

7) To the upper substrate or the lower substrate, a lower resistance film connection portion or an upper resistance film connection portion which is electrically connected with the common connection portion of the lower substrate or the upper substrate is provided.

8) The upper resistance film is formed into a shape made of a large number of thin comb-like resistance films which are provided with a common connection portion at one ends thereof and the lower resistance film is formed into a uniform resistance film.

9) An auxiliary light source device having a light guide plate and a linear lamp is disposed between the liquid crystal panel and the touch panel.

10) An auxiliary light source device having a light guide plate and a linear lamp is disposed at a back surface of the liquid crystal panel.

11) An auxiliary light source similar to the above-mentioned device is provided to the touch panel side or a linear or spot light source is provided to one side periphery of the touch panel.

As the liquid crystal panel used in the screen input type liquid crystal display device, a so-called simple-matrix type panel, an active-matrix liquid crystal type panel, or a liquid crystal panel of known type can be used. Further, the liquid crystal display device is applicable not only to a reflection-type liquid crystal display device but also to a transmission-type liquid crystal display device.

The present invention is not limited to the above-mentioned constitutions and the constitutions of embodiment which will be explained later and is applicable to a touch panel of a type which detects coordinates in response to the change of capacity or the change of other quantity of electricity between the upper substrate and the lower substrate or a digital type touch panel in the same manner, and various modification can be considered without departing from the technical concept of the present invention.

According to the present invention, it becomes possible to provide a touch panel which can prevent the occurrence of damages such as cracks on the upper resistance film or the upper substrate even when the push inputting operation is repeatedly performed and can eliminate the erroneous operation in detection of coordinates and a screen input type liquid crystal display device having a high reliability using such a touch panel.

BRIEF EXPLANATION OF THE DRAWINGS

FIG. 1A and FIG. 1B are schematic views for explaining an essential constitution of a touch panel of a first embodiment of the present invention, wherein FIG. 1A is a cross-sectional view and FIG. 1B is a plan view.

FIG. 2A and FIG. 2B are schematic views for explaining an essential constitution of a touch panel of a second embodiment of the present invention, wherein FIG. 2A is a cross-sectional view and FIG. 2B is a plan view.

FIG. 3A and FIG. 3B are schematic views for explaining an essential constitution of a touch panel of a third embodiment of the present invention, wherein FIG. 3A is a cross-sectional view and FIG. 3B is a plan view.

FIG. 4 is a schematic view for explaining an essential constitution of a touch panel of a fourth embodiment of the present invention.

FIG. 6A and FIG. 6B are views for explaining another example of the entire constitution of the touch panel of the analogue resistance film type according to the present invention, wherein FIG. 6A is a plan view of an inner surface side of an upper substrate 4A and FIG. 6B is a plan view of an inner surface side of a lower substrate 4B.

FIG. 14A and FIG. 14B are schematic cross-sectional views for explaining the essential constitution of the touch panel in FIG. 13 and the state at the time of performing the push inputting manipulation.

DESCRIPTION OF THE PREFERRED EMBODIMENTS

Figure 2A:
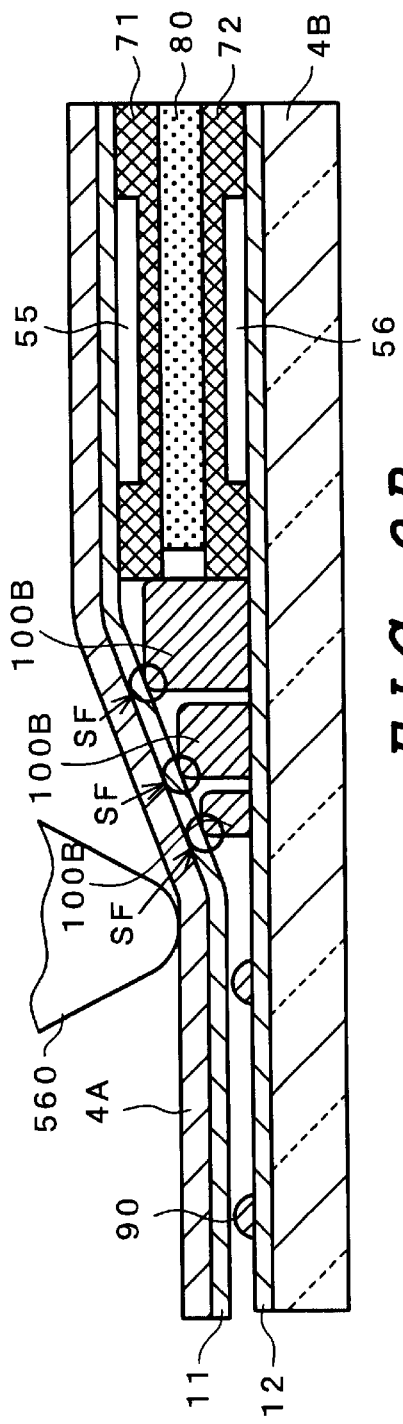

Hereinafter, embodiments of the present invention are explained in detail with reference to an embodiment which exemplifies an analogue system which detects the change of resistance.

FIG. 1A and FIG. 1B are schematic views for explaining an essential constitution of a touch panel of a first embodiment of the present invention, wherein FIG. 1A is a cross-sectional view and FIG. 1B is a plan view.

In the same manner as the constitution shown in FIG. 14A and FIG. 14B, on inner surfaces of an upper substrate 4A made of polyethylene terephthalate (PET) and a lower substrate 4B made of glass, an upper resistance film 11 and a lower resistance film 12 made of indium tin oxide (ITO) are respectively formed by coating. To an input region of the lower resistance film 12 formed on the lower substrate 4B, dot spacers 90 which prevent the upper and lower resistance films 11, 12 from coming into contact with each other in the non-inputting manipulation state (steady state) are provided. These dot spacers 90 are formed by printing by way of a mask having given apertures or a photolithography technique using photosensitive resin or the like. The interval of arrangement of dot spacers is greater than the extension of the pen tip or nib which constitutes the push inputting means.

Resistance films 11, 12 are respectively electrically connected with an upper wiring 55 and a lower wiring 56 formed on a seal region SL by printing or the like. The upper wiring 55 and the lower wiring 56 are connected with a coordinates recognition circuit disposed outside by way of lead lines not shown in the drawing.

The upper wiring 55 and the lower wiring 56 are respectively coated with protective films (insulation films) 71, 72 and these protective films 71, 72 are adhered to each other by means of a seal agent (adhesive agent or adhesive sheet) 80. In the inside of the seal region SL, an input region AR is positioned by way an inoperative region NR.

According to this embodiment, on the inoperative region NR, stress attenuating members 100A which are constituted by a set made of a plurality of independent members whose heights are gradually decreased from an outer peripheral side (seal region SR side) of the touch panel to the above-mentioned input region AR are formed.

The interval between independent members which constitute these stress attenuating members 100A is smaller than the extension of the pen tip which constitutes the push inputting means. These independent members 100A are formed simultaneous with the dot spacers 90 which are formed on the input region AR. That is, apertures which differ in diameter are formed in a printing mask for forming the dot spacers 90 and a thermosetting resist or an ultraviolet ray curing resist is printed and then is hardened to form the dot spacers 90 and the stress attenuating member 100A. These stress attenuating members 100A may be formed by using a method which discharges a suitable amount of resist on a lower substrate suitably using a dispenser or by using a known photolithography technique which forms the dot spacer 90 and the stress attenuating member 100A by coating a photosensitive resist and then performing a mask exposure and a developing processing.

As can be understood from the plan view shown in FIG. 1B, the stress attenuating members 100A are formed such that the heights thereof are gradually decreased from the seal region SL side to the above-mentioned input region AR side by making the stress attenuating members 100A have the large diameter at the seal region SL side and the small diameter at the input region AR side and by printing, discharging or forming the resist at a quantity proportional to the diameter.

Further, by adjusting the arrangement density, the interval or the like of individual stress attenuating members 100A which differ in diameter, a line which connects peak portions can be made to have a given inclination.

By fixedly securing such stress attenuating members 100A to the lower substrate 4B, as shown in FIG. 1A, when the push inputting manipulation is performed on the upper substrate 4A using the pen 560, the upper substrate 4A is deflected while tracing the line which connects the peak portions of the stress attenuating members 100A. Accordingly, the stress is dispersed to points which come into contact with the peak portions of respective stress attenuating members 100A so that no unbearable or excessive stress is applied to the upper resistance film 11 formed on the inner surface of the upper substrate 4A whereby no cracks occur on the resistance film 11. Further, damages (cracks, flaws or the like) of the upper substrate 4A per se can be obviated.

According to this embodiment, the erroneous operation of the coordinates inputted through the screen can be prevented thus realizing the screen inputting of high reliability.

Although the cross section of the stress attenuating members 100 shown in FIG. 1A and FIG. 1B has the cone shape, the cross section is not limited to this shape and the same advantageous effect can be obtained by the cross section having the elliptical cone shape, the trigonal pyramid shape, the quadrangular pyramid shape, other polygonal pyramid shape, or the circular column shape, the trigonal column shape, the quadrangular column shape or the other polygonal column shape. With respect to these shapes, since they can be easily estimated from FIG. 1A and FIG. 1B, they are not shown in the drawings in particular.

Figure 2B:
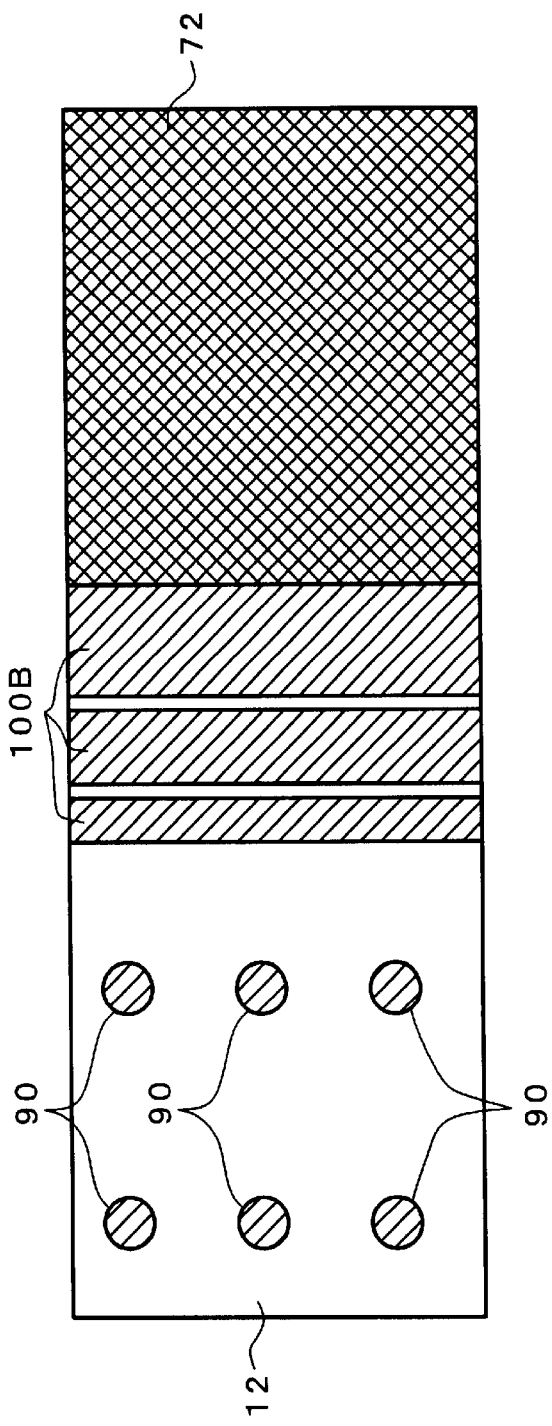

FIG. 2A and FIG. 2B are schematic views for explaining an essential constitution of a touch panel of a second embodiment of the present invention, wherein FIG. 2A is a cross-sectional view and FIG. 2B is a plan view. Symbols in FIG. 2A and FIG. 2B identical with symbols in FIG. 1A and FIG. 1B correspond to the same functional portions.

In this embodiment, in place of the stress attenuating members 100A shown in FIG. 1A and FIG. 1B, stress attenuating members 100B are constituted such that a plurality of parallel continuous wall members which gradually decrease heights thereof from the seal region SL side to the input region AR side of the touch panel are concentrically arranged about the center of the input region.

That is, the stress attenuating members 100B of this embodiment are arranged such that a plurality of continuous wall members whose cross-sectional shapes have a wide bank shape in the seal region SL side and a narrow bank shape in the input region AR side are arranged concentrically. The heights of peak surfaces of respective continuous wall members can be adjusted in the same manner as the first embodiment.

In this embodiment, when the push inputting manipulation is performed on the upper substrate 4A with a pin 560, the upper substrate 4A is deflected while tracing a line which connects peak portions of respective stress attenuating members 100B. Accordingly, the stress is dispersed to points which come into contact with tip portions of peak surfaces of respective stress attenuating members 100B so that no unbearable or excessive stress is applied to the upper resistance film 11 formed on the inner surface of the upper substrate 4A whereby no cracks occur on the resistance film 11. Further, damages (cracks, flaws or the like) of the upper substrate 4A per se can be obviated.

According to this embodiment, the erroneous operation of the coordinates inputted through the screen can be prevented thus realizing the screen inputting of high reliability.

FIG. 3A and FIG. 3B are schematic views for explaining an essential constitution of a touch panel of a third embodiment of the present invention, wherein FIG. 3A is a cross-sectional view and FIG. 3B is a plan view. Symbols in FIG. 3A and FIG. 3B identical with symbols in FIG. 1A, FIG. 1B, FIG. 2A and FIG. 2B correspond to the same functional portions.

In this embodiment, a stress attenuating member 100C is formed by raising a resist such that a resist has an inclination which can make the height of the stress attenuating member 100C large at the seal region SL side and small at the input region side. This stress attenuating member 100C may be formed such that the resist is supplied to a lower substrate 4B close to the seal region SL using a proper dispenser and the resist is flown toward the input region AR side making use of the fluidity of the supplied resist so that the stress attenuating member 100C is formed into a shape having an inclination on an upper surface thereof. Alternatively, the stress attenuating member 100C may be also formed into a shape having an inclination on the upper surface thereof by supplying a resist to a V-shaped bottom constituted by a protective film 72 of the seal region SL in the state that the lower substrate 4B is slightly inclined.

When a resist having a relatively large viscosity can be used, by coating the resist in a cross-sectional shape shown in FIG. 3A, the similar stress attenuating member 100C can be formed.

In this embodiment, when the push inputting manipulation is performed on the upper substrate 4A with a pin 560, the upper substrate 4A is deflected while tracing the upper surface of the stress attenuating members 100C. Accordingly, the stress of the upper substrate 4A is dispersed to the upper surfaces of the stress attenuating members 100C so that no unbearable or excessive stress is applied to the upper resistance film 11 formed on the inner surface of the upper substrate 4A whereby no cracks occur on the resistance film 11. Further, damages (cracks, flaws or the like) of the upper substrate 4A per se can be obviated.

According to this embodiment, the erroneous operation of the coordinates inputted through the screen can be prevented thus realizing the screen inputting of high reliability.

FIG. 4 is a schematic view for explaining an essential constitution of a fourth embodiment of a touch panel of the present invention. Symbols in FIG. 4 identical with symbols in FIG. 1A, FIG. 2A and FIG. 3A correspond to the same functional portions.

In this embodiment, a stress attenuating member 100D is formed by adhering a rubber member made of tapered silicone rubber or the like having a trapezoidal cross section onto an inoperative region NR of the lower substrate 4B with an inclination directed upwardly. Although this adhesion can be performed using an adhesive 101, a tape-like member having an adhesive coated on an adhering surface thereof or a member which is preliminarily provided with an adhesive tape on an adhering surface thereof may be used.

In this embodiment, also, when the push inputting manipulation is performed on the upper substrate 4A with a pen 560, the upper substrate 4A is deflected while tracing the upper surface of the stress attenuating members 100D. Accordingly, the stress of the upper substrate 4A is dispersed to the upper surface of the stress attenuating members 100D so that no unbearable or excessive stress is applied to the upper resistance film 11 formed on the inner surface of the upper substrate 4A whereby no cracks occur on the resistance film 11. Further, damages (cracks, flaws or the like) of the upper substrate 4A per se can be obviated.

According to this embodiment, the erroneous operation of the coordinates inputted through the screen can be prevented thus realizing the screen inputting of high reliability.

Subsequently, the detail of other constitutional portions of the touch panel according to the present invention is explained hereinafter.

Figure 5:
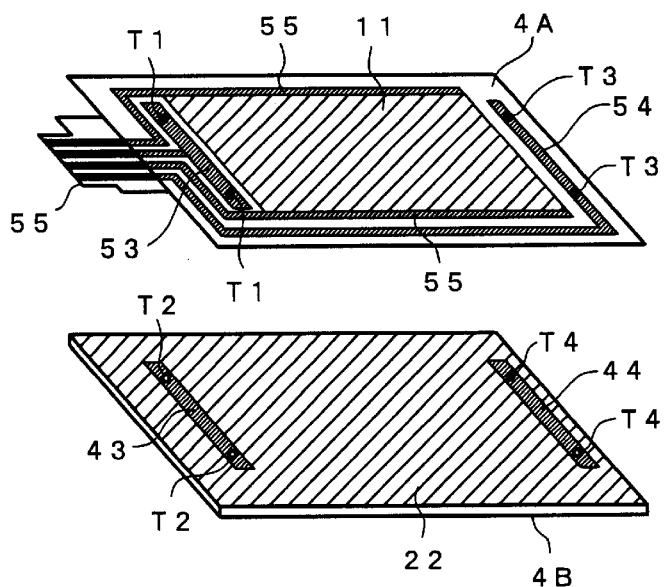
FIG. 5 is a developed perspective view for explaining an example of the entire constitution of a touch panel of an analogue resistance film type according to the present invention.

FIG. 5 is a developed perspective view for explaining one example of the entire constitution of a touch panel of an analogue resistance film type according to the present invention. As explained in the above-mentioned respective embodiments, the touch panel is comprised of two transparent substrates. The upper substrate 4A is constituted such that on a whole inner surface of a soft film made of polyethylene terephthalate (PET) film, the resistance film 11 preferably made of indium tin oxide (ITO) is formed in a planar manner.

Similarly, the lower substrate 4B is constituted such that on a whole inner surface of a hard substrate preferably made of glass, the resistance film 22 preferably made of ITO is formed in a planar manner.

Further, on one pair of parallel sides of the upper resistance film 11 of the upper substrate 4A, the wiring portion 55 which is electrically connected with the resistance film 11 is formed and a terminal is formed on the upper wiring (interface portion) 55 which constitutes a connection portion with an external circuit (coordinates detection circuit). Further, on other pair of parallel sides of the upper resistance film 11, the downside connection portions 53, 54 which are electrically insulated from the upper resistance film 11 are formed and these connection portions 53, 54 are pulled around and reach the wiring portion 55 to form terminals.

At positions on the lower resistance film 22 of the lower substrate 4B which correspond to the above-mentioned downside connection portions 53, 54, the upside connection portions 43, 44 are formed. When the lower substrate 4B is laminated to the upper substrate 4A, connection points Ti, T3 of the downside connection portions 53, 54 of the upper substrate 4A and connection points T2, T4 of the upside connection portions 43, 44 of the lower substrate are electrically connected with each other through a conductive material preferably made of a silver paste. Although it is preferable that the downside connection portions 53, 54 and the upside connection portions 43, 44 are made of a material equal to that of the resistance films in terms of the easiness of the fabrication steps, it is needless to say that these connection portions may be made of a material different from that of the resistance films.

In this manner, two-dimensional coordinates are formed by the resistance films 11, 22 formed on the upper and lower substrates and the coordinates value (x,y) of a push point (input point)→(x: X coordinates value, y: Y coordinates value) can be detected by the external circuit.

Figure 6A:
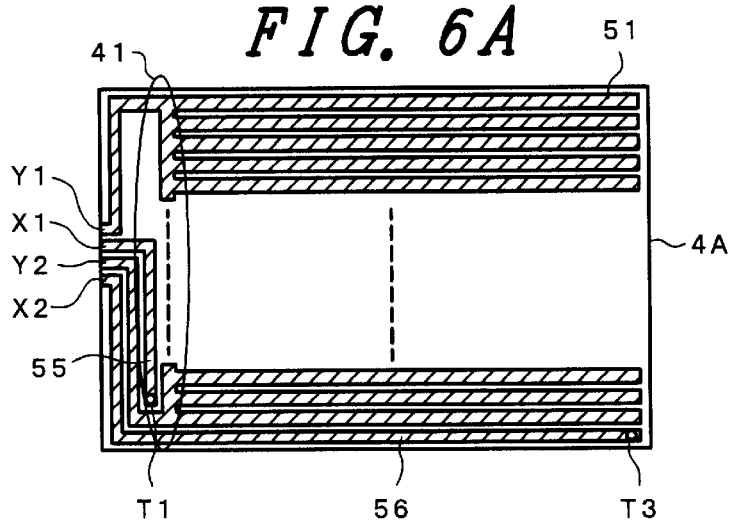
Figure 6B:
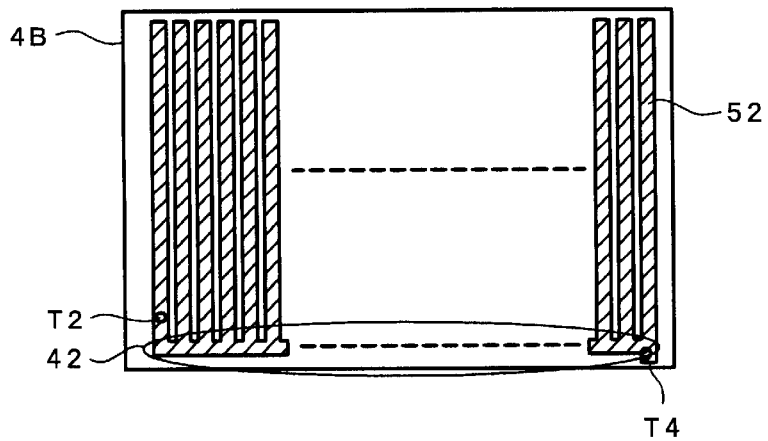

FIG. 6A and FIG. 6B are views for explaining another example of the entire constitution of the touch panel of the analogue resistance film type according to the present invention, wherein FIG. 6A is a plan view of an inner surface side of an upper substrate 4A and FIG. 6B is a plan view of an inner surface side of a lower substrate 4B.

In FIG. 6A, the upper substrate 4A is made of a PET film and an upper common connection portion 41 made of ITO and a comb-shaped resistance film 51 made of a large number of thin resistance films are formed on an inner surface of the PET film, wherein the upper common connection portion 41 is disposed at one peripheral side of the inner surface of the PET film and the comb-shaped resistance film 51 extends from the upper common connection portion 41 to the other peripheral side of the PET film. Terminals Y1, Y2 are respectively pulled out from both ends of the above-mentioned upper common connection portion 41. Further, the upper substrate 4A further includes a wiring portion (first counter electrode wiring portion) 55 formed in the vicinity of the upper common connection portion 41 and a wiring portion (second counter electrode wiring portion) 56 formed in parallel with the comb-shaped resistance film 51 at the outside (the lowermost side in the drawing) of the comb-shaped resistance film 51 and terminals X1, X2 are respectively pulled out from these wiring portions. The wiring portions 55, 56 are simultaneously formed with the comb-shaped resistance film 51 and the common connection portion 41 using the same ITO.

These terminals Y1, Y2 and the terminals X1, X2 constitute an interface portion for connection with an external circuit.

On the other hand, as shown in FIG. 6B, the lower substrate 4B forms a lower common connection portion 42 and a comb-shaped resistance film 52 made of a large number of resistance thin films on an inner surface of a glass substrate wherein the lower common connection portion is disposed at one peripheral side of the inner surface of the glass substrate and the comb-shaped resistance film 52 extends from the lower connection portion 42 to the other peripheral side of the glass substrate.

The upper substrate 4A and the lower substrate 4B having such a constitution make their inner surfaces face each other in an opposed manner and are laminated to each other while making respective comb-shaped resistance films 51, 52 intersect (perpendicularly here) each other. Here, connection points T1, T3 of the upper substrate 4A are respectively electrically connected with connection points T2, T4 of the lower substrate 4B using a silver paste. Due to such a constitution, the terminals Y1, Y2 and the terminals X1, X2 are respectively bridged to an upper common connection portion 41 of the upper substrate 4A and a lower common connection portion 42 of the lower substrate 4B so as to form detection terminals. Then, in the external circuit, based on a resistance value corresponding to a distance between contact points of the upper comb-shaped resistance film 51 and the lower comb-shaped resistance film 52 at an input point by pushing and respective common connection points, the coordinates (x, y) are detected.

Figure 7:
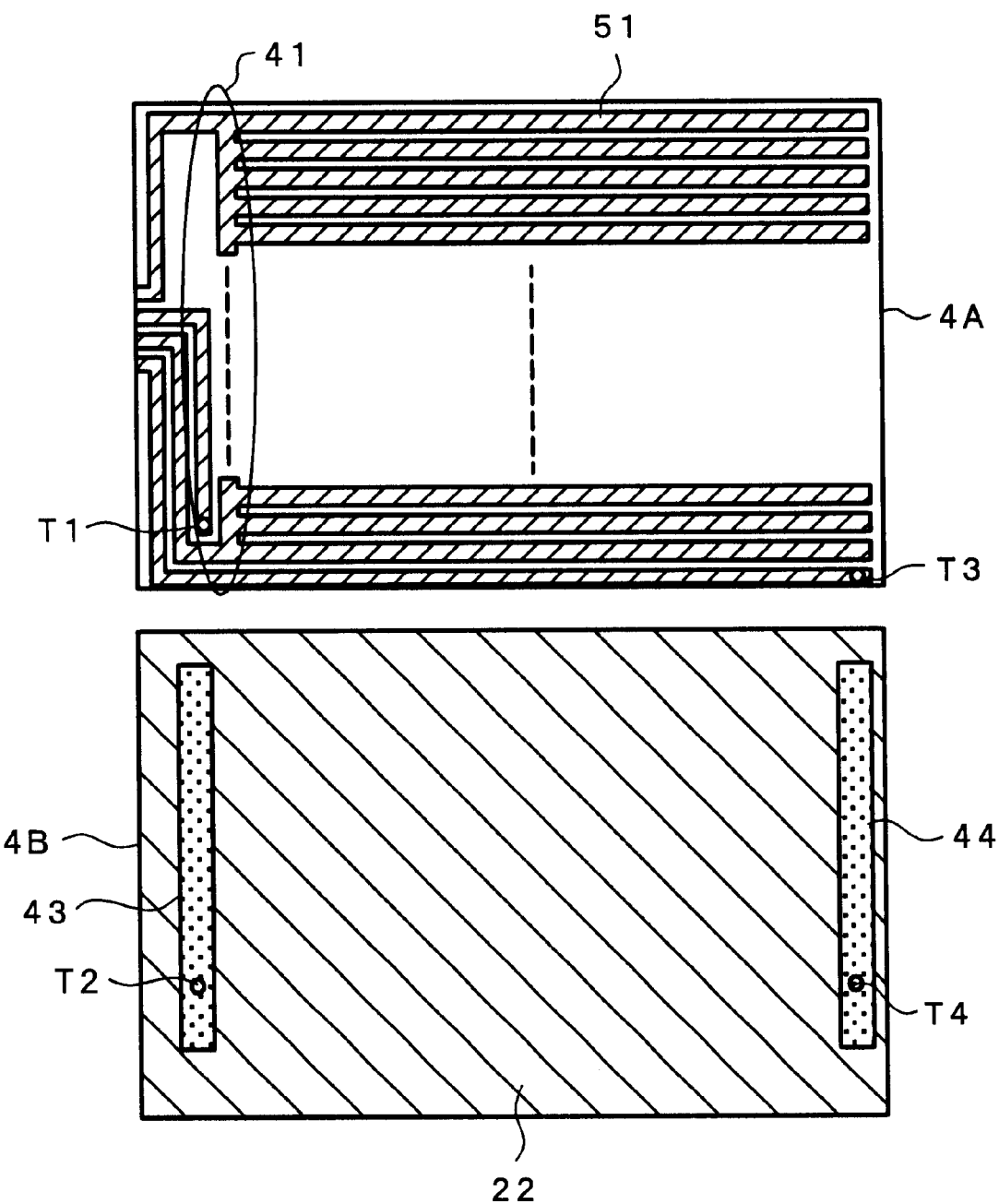
FIG. 7 is an inner constitutional view of an upper substrate and a lower substrate for schematically explaining still another example of the entire constitution of the touch panel of the analogue resistance film type according to the present invention.

FIG. 7 is an inner constitutional view of an upper substrate and a lower substrate for schematically explaining still another example of the entire constitution of the touch panel of the analogue resistance film type according to the present invention. The upper substrate 4A has the constitution similar to the constitutions of FIG. 6A and FIG. 6B, while the lower substrate 4B has the constitution similar to the constitution as explained in conjunction with FIG. 5.

In this constitutional example, since the resistance film 22 formed on the lower substrate 4B has a relatively stable resistance value compared to the upper substrate since the lower substrate is a hard plate made of glass. The upper substrate 4A and the lower substrate 4B are laminated such that their inner surfaces face each other in an opposed manner. Here, connection points T1, T3 of the upper substrate 4A are respectively electrically connected with connection points T2, T4 of the lower substrate 4B using a silver paste.

Due to such a constitution, in the same manner as the above instance, based on a resistance value corresponding to a distance between contact points of an upper comb-shaped resistance film 51 and a resistance film 22 of the lower substrate at an input point by pushing and respective common connection points of the upper substrate 4A, the coordinates (x, y) are detected.

Then, one embodiment of a screen input type liquid crystal display device according to the present invention using the above-mentioned touch panel is explained. In the following explanation, although the display device on which an auxiliary illumination device is mounted is described, such an auxiliary illumination device can be omitted.

Figure 8:
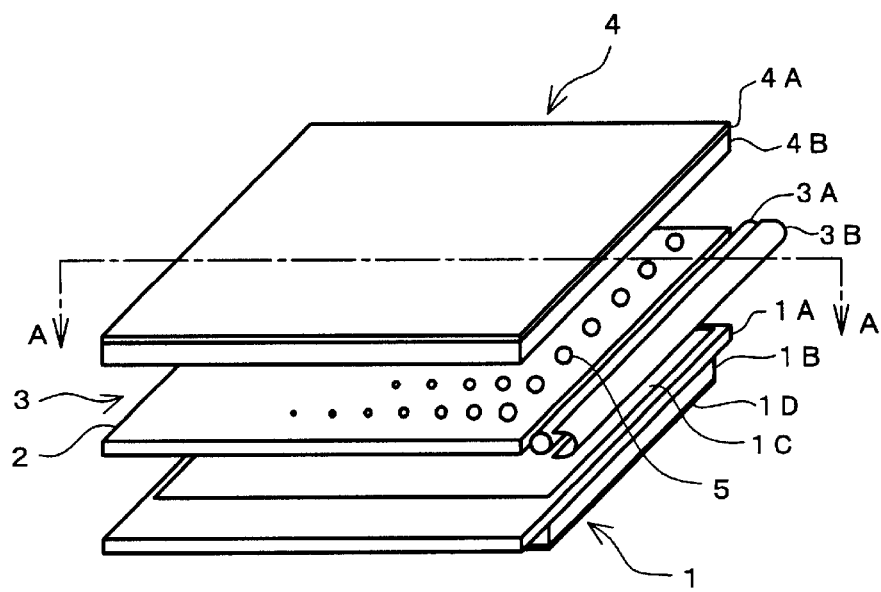
FIG. 8 is a developed perspective view for explaining a constitution of a screen input type liquid crystal display device of a first embodiment of the present invention.

FIG. 8 is a developed perspective view for explaining the constitution of the first embodiment of the screen input type liquid crystal display device according to the present invention. Numeral 1 indicates a liquid crystal panel of a reflection type, wherein numeral 1A indicates an upper substrate, numeral 1B indicates a lower substrate, numeral 1C indicates a polarizer and numeral 1D indicates a reflection plate. Although the liquid crystal panel is constituted such that the lower substrate is made of a transparent plate and the reflection plate is mounted on the back surface of the lower substrate, a reflection treatment may be applied to an inner surface of the lower substrate. In this case, the reflection plate 1D is unnecessary.

Numeral 2 indicates a light guide plate made of an acrylic resin plate or the like which constitutes an auxiliary light source device, numeral 3 indicates an auxiliary light source device 3, numeral 3A indicates a linear lamp (a linear light source made of a linear fluorescent lamp or a light emitting diode array, hereinafter simply called "lamp"), numeral 3B indicates a lamp reflection sheet, numeral 4 indicates a touch panel, numeral 4A indicates a soft film sheet (upper substrate) and numeral 4B indicates a hard substrate made of glass, acrylic resin or polycarbonate or the like (lower substrate, glass plate in this embodiment).

Then, to the liquid crystal panel 1, the auxiliary light source device 3 including the light guide plate 2 made of acrylic resin and having a thickness of 1.5 mm, for example, the lamp 3A and the reflection sheet 3B is laminated. Further, to the auxiliary light source device 3, the touch panel 4 is laminated. The liquid crystal panel 1 is not limited to the reflection-type liquid crystal panel shown in the drawing and a semi-transmitting-type liquid crystal panel can be also used.

In this embodiment, irregularities in a microprism shape, a slit shape or a dot shape or a printing (dot-shaped printing in this embodiment) for diffusing light are provided to an upper surface, that is, an touch panel 4 side of the light guide plate 2 and a cold cathode fluorescent tube having a diameter of 2.0 mm is used as the lamp 3A which constitutes the auxiliary light source device 3. However, for miniaturizing the liquid crystal panel 1 and enhancing the power consumption characteristics of the liquid crystal display 1, it is desirable to use a cold cathode fluorescent tube having a further smaller diameter.

Figure 9:
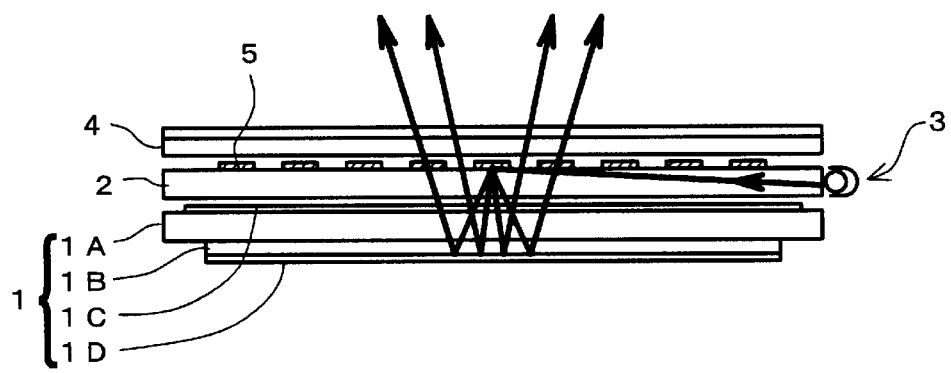
FIG. 9 is a cross-sectional view taken along a line A—A of FIG. 8 for explaining the manner of operation of an auxiliary light source in the screen input type liquid crystal display device of a first embodiment of the present invention.

FIG. 9 is a cross-sectional view taken along a line A—A of FIG. 8 for explaining the manner of operation of the auxiliary light source device in the first embodiment of the screen input type liquid crystal display device of the present invention. The dot-shaped printing 5 is provided to a touch panel side surface of the light guide plate 2 which constitutes the auxiliary light source device 3. As indicated by an arrow in the drawing, light irradiated from the lamp 3A is reflected in the direction toward the liquid crystal panel 1 and, at the same time, the light reflected on the liquid crystal panel 1 is made to pass through the touch panel 4 and to be irradiated to a display screen side.

It is preferable that these liquid crystal panel, the auxiliary light source device and the touch panel are formed integrally by adhering respective end portions using a pressure sensitive adhesive double coated tape. However, other securing means such as a mechanical confining frame or an adhesive agent may be used.

Although the auxiliary light source device may be always lit, when the auxiliary light source device is mounted on a portable information equipment such as a so-called PDA or a notebook type personal computer which is required to suppress the power consumption thereof, the auxiliary light source device may be lit when necessary.

According to this embodiment, a liquid crystal display device using a touch panel having a high reliability which can eliminate inputting errors or an invalid inputting can be obtained.

Figure 10:
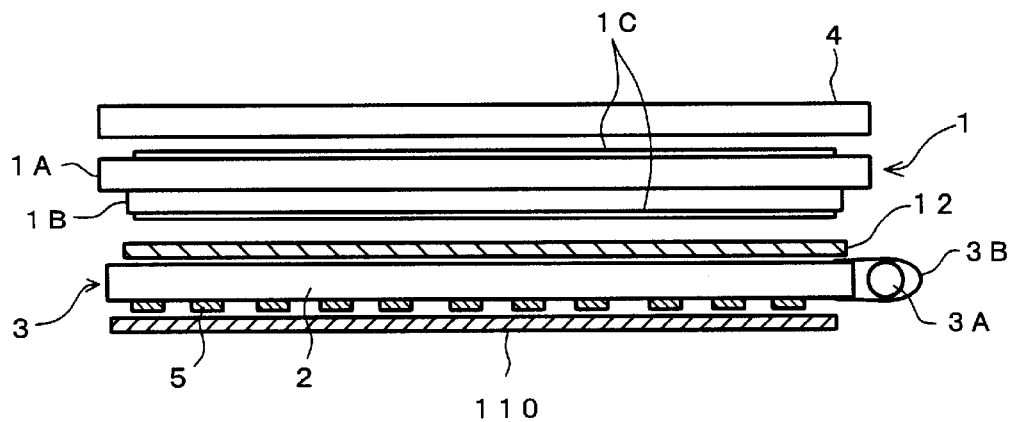
FIG. 10 is a developed perspective view for explaining a screen input type liquid crystal display device of a second embodiment of the present invention.
Figure 11A:
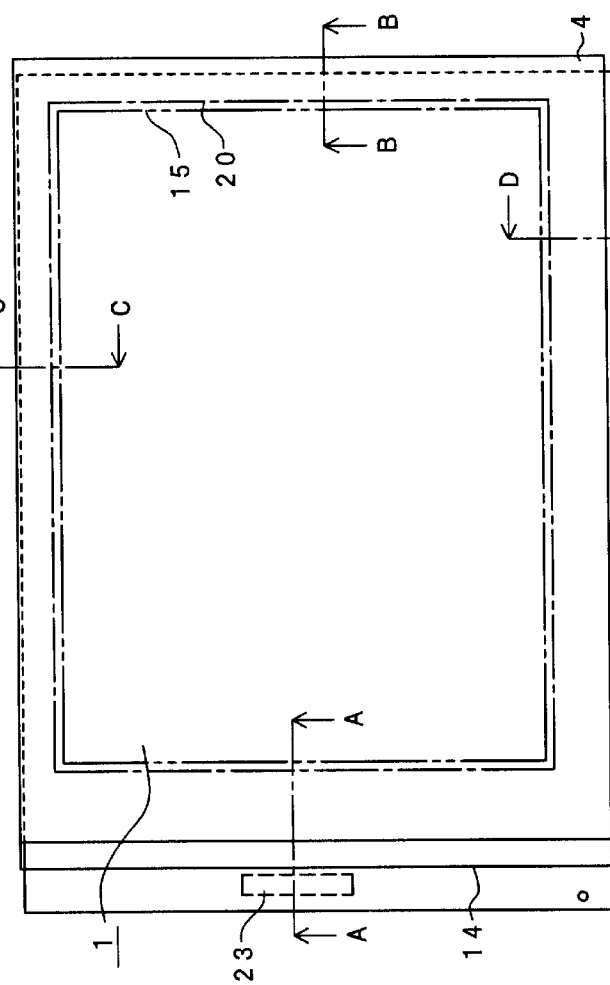
FIG. 11A–FIG. 11E are views as seen from five directions for explaining an actual constitutional example of the screen input type liquid crystal display device of the present invention.
Figure 11B:
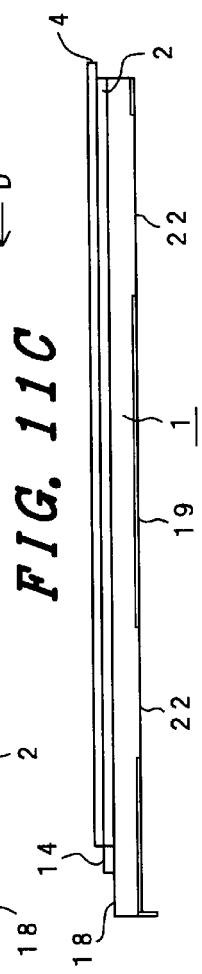
Figure 11C:
Figure 11D:
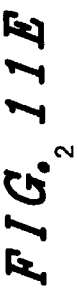
Figure 11E:
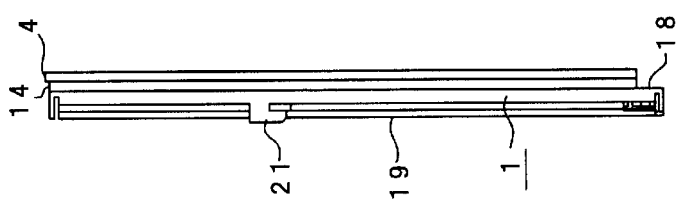

FIG. 10 is a schematic cross-sectional view for explaining the second embodiment of the screen input type liquid crystal display device according to the present invention. In this embodiment, the screen input type liquid crystal display device includes a transmission type liquid crystal panel 1 and an auxiliary light source device, that is, a so-called backlight 3. The backlight 3 is laminated to the back of the transmission type liquid crystal panel 1. In operation, an illumination light irradiated from the back light 3 and passing through the liquid crystal panel 1 is modulated by images formed in the liquid crystal panel 1 and the modulated light is irradiated to the surface side of the liquid crystal panel 1 to visualize the images.

To the display surface side (screen side) of this liquid crystal panel 1, the above-mentioned touch panel 4 according to the present invention is laminated and information is inputted from the display surface of the liquid crystal panel 1.

That is, this screen input type liquid crystal display device has a following constitution. A liquid crystal layer is sandwiched between two transparent substrates 1A, 1B and poralizers 1C are mounted on a front surface side and a back surface side of the liquid crystal layer so as to form the liquid crystal panel 1. On the back surface of the liquid crystal panel 1, the auxiliary light source device 3 which includes an approximately rectangular transparent light guide plate 2 and a lamp 3A and a lamp reflection sheet 3B arranged along one periphery of the light guide plate 2 is mounted. In the course of propagating the light irradiated from the illuminating light source 3 in the light guide plate 2, the light path is changed to the liquid crystal panel direction and the light illuminates the liquid crystal panel 1 from the back surface thereof. Further, the dotted printing 5 or the like is formed on the back surface of the light guide plate 1 so as to obtain the uniform brightness over the entire region of the liquid crystal panel.

On the back surface side of the light guide plate 2, a reflection plate 110 which totally reflects the light irradiated from the light guide plate 2 toward the back surface and returns the light to the liquid crystal panel 1 side is mounted.

Such an auxiliary light source device, that is, the backlight 3 is laminated to the liquid crystal panel 1 by way of a light quantity distribution adjusting member such as the light diffusion film 12, a prism plate (not shown in the drawing) or the like so as to constitute the transmission type liquid crystal display device.

FIG. 11A to FIG. 11E are views as seen from five directions respectively for explaining an actual constitutional example of a screen input type liquid crystal display device according to the present invention. In the drawing, to a liquid crystal panel 1 (accommodated in a casing constituted by an upper case 18 and a lower case 19), a light guide plate 2 which constitutes a front light is laminated. Further, a touch panel 4 is laminated to the light guide plate 2 so as to constitute a liquid crystal display device.

Numeral 15 indicates a display region of the screen input type liquid crystal display device and numeral 20 indicates an input region of the touch panel 4.

With respect to the liquid crystal panel 1, pawls 21 and hooks 22 formed on the upper case 18 which accommodate the liquid crystal panel and a drive circuit therein are engaged with the lower case 19 to constitute a casing. The front light is constituted by arranging the lamp 3A (disposed in the inside of a lamp reflection sheet 3B) along one side of the light guide plate 2 and the touch panel 4 is laminated to the light guide plate 2. Indication of signal cables of the touch panel 4 and a power supply cable of the lamp 3A in the drawing is omitted.

Further, numeral 23 indicates an interface connector for connecting the screen input type liquid crystal display device with a host computer side.

Figure 12:
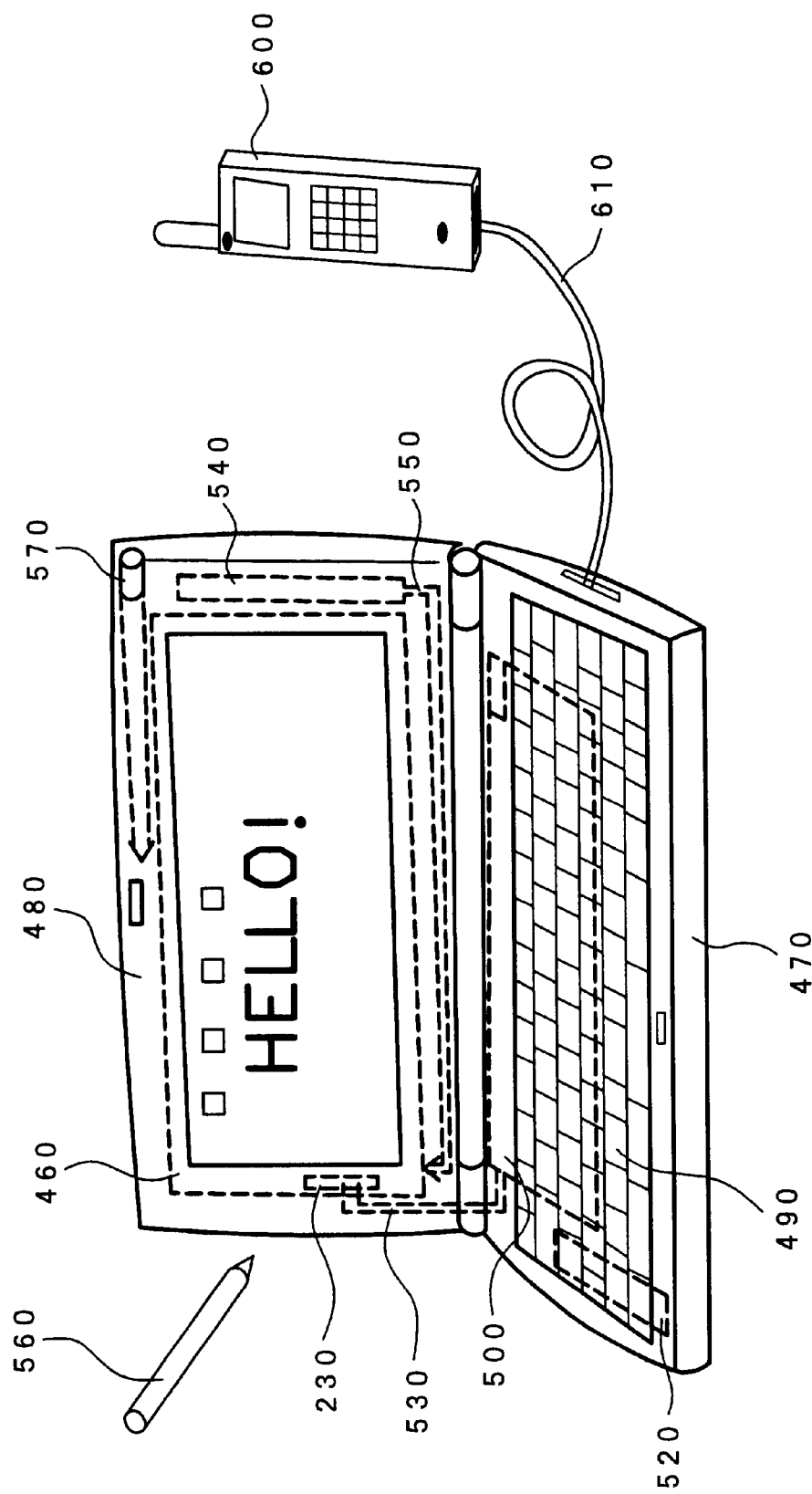
FIG. 12 is a perspective view for explaining a constitutional example of a portable information terminal as an example of an electronic equipment on which the screen input type liquid crystal display device of the present invention is mounted.
Figure 13:
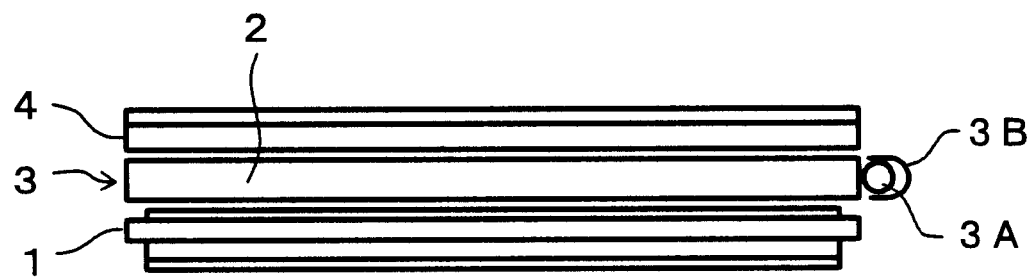
FIG. 13 is a schematic cross-sectional view for explaining a constitutional example of a screen input type liquid crystal display device which is a liquid crystal display device having a touch panel.

FIG. 12 is a perspective view for explaining a constitutional example of a portable information terminal as an example of an electronic equipment on which the screen input type liquid crystal display device according to the present invention is mounted. This portable information terminal (PDA) is constituted by a body part 470 which accommodates a host computer 500 and a battery 520 and is provided with a key board 490 on a surface thereof and a display part 480 on which the screen input type liquid crystal display device 460 and an inverter 540 for a front light are mounted.

A portable telephone 600 can be connected to the main body 470 through a connection cable 610 thus realizing the communication between the portable information terminal and a remote site.

The screen input type liquid crystal display device 460 of the display part 480 and the host computer 470 are connected with each other by an interface cable 530.

Further, a pen holder 570 is mounted on a portion of the display part 480 and an input pen 560 is accommodated in the pen holder 570.

This screen input type liquid crystal display device enables various manipulations including the inputting of information using a keyboard 490, the inputting of various information by pushing, the tracing or the filling in the surface of the touch panel with the input pen 560, the selection of information displayed on the liquid crystal panel, the selection of processing functions and others various manipulations.

The shape and the structure of this kind of portable information terminal (PDA) are not limited to those shown in the drawings and portable information terminals having versatile shapes, structures and functions are considered.

What is claimed is:

1. A touch panel comprising:
    an upper substrate having an upper resistance film formed on an inner surface of a soft film member,
    a lower substrate having a lower resistance film formed on an inner surface of a hard plate,
    a seal region for laminating said upper substrate and said lower substrate,
    dot spacers disposed in a gap defined between opposing surfaces of said upper and lower resistance films,
    an input region capable of obtaining a detection output which sets a contact position of said upper resistance film and said lower resistance film as a two-dimensional coordinates value when a push inputting manipulation is performed to push said upper substrate to said lower substrate side, and
    an input inoperable region where said upper substrate is bent toward said lower substrate side due to said push inputting manipulation in a periphery of said input region and in the inside of said seal region, wherein
    said touch panel further includes a stress attenuating member which gradually decreases a height thereof from said seal region side to said input region side in said input inoperable region.

2. A touch panel according to claim 1, wherein said stress attenuating member is a set of a plurality of independent members which gradually decrease heights thereof from said seal region side to said input region side.

3. A touch panel according to claim 1, wherein said stress attenuating member is constituted by concentrically arranging a plurality of parallel continuous wall members about the center of said input region as a center and said continuous wall members gradually decrease heights thereof from said seal region side to said input region side.

4. A touch panel according to claim 1, wherein said stress attenuating member is made of a material equal to a material of said dot spacers or a protective film for coating a wiring.

5. A screen input type liquid crystal display device comprising:
    a liquid crystal panel sandwiching a liquid crystal layer between a pair of substrates, and
    a touch panel laminated to a screen of said liquid crystal panel, wherein said touch panel includes:
    an upper substrate having an upper resistance film formed on an inner surface of a soft film member,
    a lower substrate having a lower resistance film formed on an inner surface of a hard plate,
    a seal region for laminating said upper substrate and said lower substrate,
    dot spacers disposed in a gap defined between opposing surfaces of said upper and lower resistance films,
    an input region capable of obtaining a detection output which sets a contact position of said upper resistance film and said lower resistance film as a two-dimensional coordinates value when a push inputting manipulation is performed to push said upper substrate to said lower substrate side, and
    an input inoperable region where said upper substrate is bent toward said lower substrate side due to said push inputting manipulation in a periphery of said input region and in the inside of said seal region, and
    said touch panel further including a stress attenuating member which gradually decreases a height thereof from said seal region side to said input region side in said input inoperable region.

6. A screen input type liquid crystal display device according to claim 5, wherein said stress attenuating member is a set of a plurality of independent members which decrease heights thereof from said seal region side to said input region side.

7. A screen input type liquid crystal display device according to claim 5, wherein said stress attenuating member is constituted by concentrically arranging a plurality of parallel continuous wall members about the center of said input region as a center and said continuous wall members gradually decrease heights thereof from said seal region side to said input region side.

8. A screen input type liquid crystal display device according to claim 5, wherein said stress attenuating member is made of a material equal to a material of said dot spacers or a protective film for coating a wiring.

* * * * *